United States Patent [19]

Castellano et al.

[11] Patent Number: 5,065,396
[45] Date of Patent: * Nov. 12, 1991

[54] INVERSE MULTIPLEXER AND DEMULTIPLEXER TECHNIQUES

[75] Inventors: James J. Castellano, Freehold; John H. Leshchuk, Tinton Falls; Michael L. Steinberger, Colts Neck, all of N.J.

[73] Assignee: AT&T Bell Laboratories, Murray Hill, N.J.

[ * ] Notice: The portion of the term of this patent subsequent to Oct. 29, 2008 has been disclaimed.

[21] Appl. No.: 460,209

[22] Filed: Jan. 2, 1990

[51] Int. Cl.$^5$ .............................................. H04J 3/22
[52] U.S. Cl. ..................... 370/84; 370/112; 370/118
[58] Field of Search ............. 370/84, 112, 118, 100.1, 370/102, 105, 105.1

[56] References Cited

U.S. PATENT DOCUMENTS

| | | |
|---|---|---|
| 4,156,796 | 5/1979 | O'Neal et al. ............................ 178/3 |
| 4,188,665 | 2/1980 | Nagel et al. ........................ 364/200 |
| 4,204,093 | 5/1980 | Yeh ........................................ 370/95 |
| 4,322,844 | 5/1982 | Fellinger et al. ....................... 370/84 |
| 4,330,689 | 5/1982 | Kang et al. ......................... 179/15.55 |
| 4,383,316 | 5/1983 | Seidel .................................... 370/118 |
| 4,409,683 | 10/1983 | Woodward .......................... 370/112 |
| 4,558,445 | 12/1985 | Novick .................................. 370/84 |
| 4,617,659 | 10/1986 | Chopping et al. .................... 370/100 |
| 4,744,082 | 5/1988 | Fujimura et al. .................... 370/112 |

OTHER PUBLICATIONS

Manes, *Proc. 1978 Ultrasonics Symposium*, Cherry Hill, N.J. pp. 549–552.
Ekelund et al., *Ericsson Review*, vol. 65, No. 3, Mar. 1988 pp. 122–128.
Davidsson et al., *Ericsson Review*, vol. 65, No. 2, 1988, pp. 51–55.

*Primary Examiner*—Douglas W. Olms
*Assistant Examiner*—Alpus H. Hsu
*Attorney, Agent, or Firm*—Barry H. Freedman

[57] ABSTRACT

An Inverse Multiplexer is disclosed which first demultiplexes a first data rate input signal into a plurality of second lower data rate subsectional signals, where each subsectional signal is provided with a periodic synchronization marker and includes a data rate which is less than the channel data rate used to transmit that subsectional signal to a remote terminal. Programmable Multiplexers (PMUXs) then operate to each take one or more subsectional signals that are (1) clock synchronized to a PMUX clock, and (2) a rational fraction of the channel data rate, and map contiguously assigned time slots in a capacity domain frame for each subsectional signal to time slots of a time domain frame format using a 2-step or 3-step digit reverse technique. The resultant time domain format has the input subsectional capacity domain time slots substantially uniformly distributed over the time domain frame. At the receiving end, an Inverse Demultiplexer performs the reverse operation to recover the original first data rate input signal.

7 Claims, 6 Drawing Sheets

FIG. 3

NUMBER BASES: $X_1=3$; $X_2=3$; $X_3=5$ $X + X_1 \cdot 3 \cdot 5 + X_2 \cdot 5 + X_3$;   $X_3 \cdot 3 \cdot 3 + X_2 \cdot 3 + X_1 = Y$

| X | $X_1$ | $X_2$ | $X_3$ | | $X_3$ | $X_2$ | $X_1$ | Y |
|---|---|---|---|---|---|---|---|---|
| 00 | 0 | 0 | 0 | | 0 | 0 | 0 | 0 |
| 01 | 0 | 0 | 1 | | 1 | 0 | 0 | 9 |
| 02 | 0 | 0 | 2 | | 2 | 0 | 0 | 18 |
| 03 | 0 | 0 | 3 | | 3 | 0 | 0 | 27 |
| 04 | 0 | 0 | 4 | | 4 | 0 | 0 | 36 |
| 05 | 0 | 1 | 0 | | 0 | 1 | 0 | 3 |
| 06 | 0 | 1 | 1 | | 1 | 1 | 0 | 12 |
| 07 | 0 | 1 | 2 | | 2 | 1 | 0 | 21 |
| 08 | 0 | 1 | 3 | | 3 | 1 | 0 | 30 |
| 09 | 0 | 1 | 4 | | 4 | 1 | 0 | 39 |
| 10 | 0 | 2 | 0 | | 0 | 2 | 0 | 6 |
| 11 | 0 | 2 | 1 | | 1 | 2 | 0 | 15 |
| 12 | 0 | 2 | 2 | | 2 | 2 | 0 | 24 |
| 13 | 0 | 2 | 3 | | 3 | 2 | 0 | 33 |
| 14 | 0 | 2 | 4 | | 4 | 2 | 0 | 42 |
| 15 | 1 | 0 | 0 | | 0 | 0 | 1 | 1 |
| 16 | 1 | 0 | 1 | | 1 | 0 | 1 | 10 |
| 17 | 1 | 0 | 2 | | 2 | 0 | 1 | 19 |
| 18 | 1 | 0 | 3 | | 3 | 0 | 1 | 28 |
| 19 | 1 | 0 | 4 | | 4 | 0 | 1 | 37 |
| 20 | 1 | 1 | 0 | | 0 | 1 | 1 | 4 |
| 21 | 1 | 1 | 1 | | 1 | 1 | 1 | 13 |
| 22 | 1 | 1 | 2 | | 2 | 1 | 1 | 22 |
| 23 | 1 | 1 | 3 | | 3 | 1 | 1 | 31 |
| 24 | 1 | 1 | 4 | | 4 | 1 | 1 | 40 |
| 25 | 1 | 2 | 0 | | 0 | 2 | 1 | 7 |
| 26 | 1 | 2 | 1 | | 1 | 2 | 1 | 16 |
| 27 | 1 | 2 | 2 | | 2 | 2 | 1 | 25 |
| 28 | 1 | 2 | 3 | | 3 | 2 | 1 | 34 |
| 29 | 1 | 2 | 4 | | 4 | 2 | 1 | 43 |
| 30 | 2 | 0 | 0 | | 0 | 0 | 2 | 2 |
| 31 | 2 | 0 | 1 | | 1 | 0 | 2 | 11 |
| 32 | 2 | 0 | 2 | | 2 | 0 | 2 | 20 |
| 33 | 2 | 0 | 3 | | 3 | 0 | 2 | 29 |
| 34 | 2 | 0 | 4 | | 4 | 0 | 2 | 38 |
| 35 | 2 | 1 | 0 | | 0 | 1 | 2 | 5 |
| 36 | 2 | 1 | 1 | | 1 | 1 | 2 | 14 |
| 37 | 2 | 1 | 2 | | 2 | 1 | 2 | 23 |
| 38 | 2 | 1 | 3 | | 3 | 1 | 2 | 32 |
| 39 | 2 | 1 | 4 | | 4 | 1 | 2 | 41 |
| 40 | 2 | 2 | 0 | | 0 | 2 | 2 | 8 |
| 41 | 2 | 2 | 1 | | 1 | 2 | 2 | 17 |
| 42 | 2 | 2 | 2 | | 2 | 2 | 2 | 26 |
| 43 | 2 | 2 | 3 | | 3 | 2 | 2 | 35 |
| 44 | 2 | 2 | 4 | | 4 | 2 | 2 | 44 |

CAPACITY DOMAIN ADDRESS

TIME DOMAIN ADDRESS

INVERSE MULTIPLEXER AND DEMULTIPLEXER TECHNIQUES

TECHNICAL FIELD

The present invention relates to inverse multiplexer techniques that demultiplex high non-standard channel data rate signals and adapt each non-standard data rate signal to lower standard channel data signals for transmission over a commercial communication network to a remote receiver where an inverse demultiplexer adapts and multiplexes the received standard data rate signals to reproduce the original non-standard higher data rate signal and transmit it to the destined user.

DESCRIPTION OF THE PRIOR ART

In recent years there is a substantial need for communicating with data rates between 10 Mb/s to 1 Gb/s, as, for example, the SONET STS1 51.84 Mb/s and SONET STS3 155.52 Mb/s transmission rates, High Definition Television programming at 120 Mb/s or greater, and a Gb/sec supercomputer transmission rate. Such applications cannot directly transmit data messages over existing telecommunications networks using, for example, the 45 Mb/s DS3 rate, because the data rate of the specialized application does not match, and may be greater than the data rate used by the existing telecommunication networks. Therefore, to transmit data messages for such applications between remote locations, it becomes necessary to build a separate, specially designed, telecommunication network to link these remote locations. Where such remote locations are spread over wide distances, such as across the United States, the development costs may not justify construction of short or long haul facilities to support each of the different specialized applications.

An alternative solution might be to design specialized data rate converters to meet the criteria of each application. In this regard see, for example, U.S. Pat. No. 4,322,844 issued to F. Fellinger et al. on Mar. 30, 1982, where a transmitter-receiver synchronizer provides bidirectional rate conversion between frames of data having a first rate and a first format, and frames of data having a second rate and a second format. In such synchronizer, a first frame of data at a first rate, and a second frame of data at a second rate are stored in a separate first and second buffer memory, respectively, during a first frame interval, and each frame of data is read out at the other rate during a second frame interval. Additionally, during the second frame interval, a third frame of data at the second rate, and a fourth frame of data at the first rate are read into the first and second buffer memories, respectively, and read out at the other rate during a third frame interval, etc. Another synchronizer is shown in U.S. Pat. No. 4,558,445 issued to L. R. Novick on Dec. 10, 1985, wherein an applique rate converter generates a composite data stream comprising alternate data bits and data boundary bits, and the synchronizer increases such composite stream to the output data rate. Such specialized arrangements are expensive and would require a new design for converting different data rates associated with each different application, and may not be usable for all applications.

Therefore, the problem remaining in the prior art is to provide a technique that permits specialized applications to economically send their higher data rate signal over existing lower data rate telecommunication networks, and thereby avoid constructing expensive specialized high data rate long or short haul networks, or expensive specialized data rate converters, and provide for a more economic use of the unused capacity of existing networks.

SUMMARY OF THE INVENTION

The foregoing problem in the prior art has been solved in accordance with the present invention which relates to Inverse Multiplexer and Inverse Demultiplexer techniques. An Inverse Multiplexer includes a Demultiplexer which demultiplexes a high data rate input signal to subsectional output signals which comprise fractional parts of that high data rate signal, and synchronization means which marks each of the subsectional output signals for later resynchronization at the receiver. A Programmable Multiplexer then multiplexes one or more of such subsectional output rate signals for transmission over existing facilities.

Other and further aspects of the present invention will become apparent during the course of the following description and by reference to the accompanying drawings.

BRIEF DESCRIPTION OF THE DRAWINGS

FIG. 3 is a table listing the conversion of the capacity domain to time domain assignments for use in the mapping of FIG. 2 for the exemplary two-step method in accordance with the present invention;

DETAILED DESCRIPTION

Figure 1:
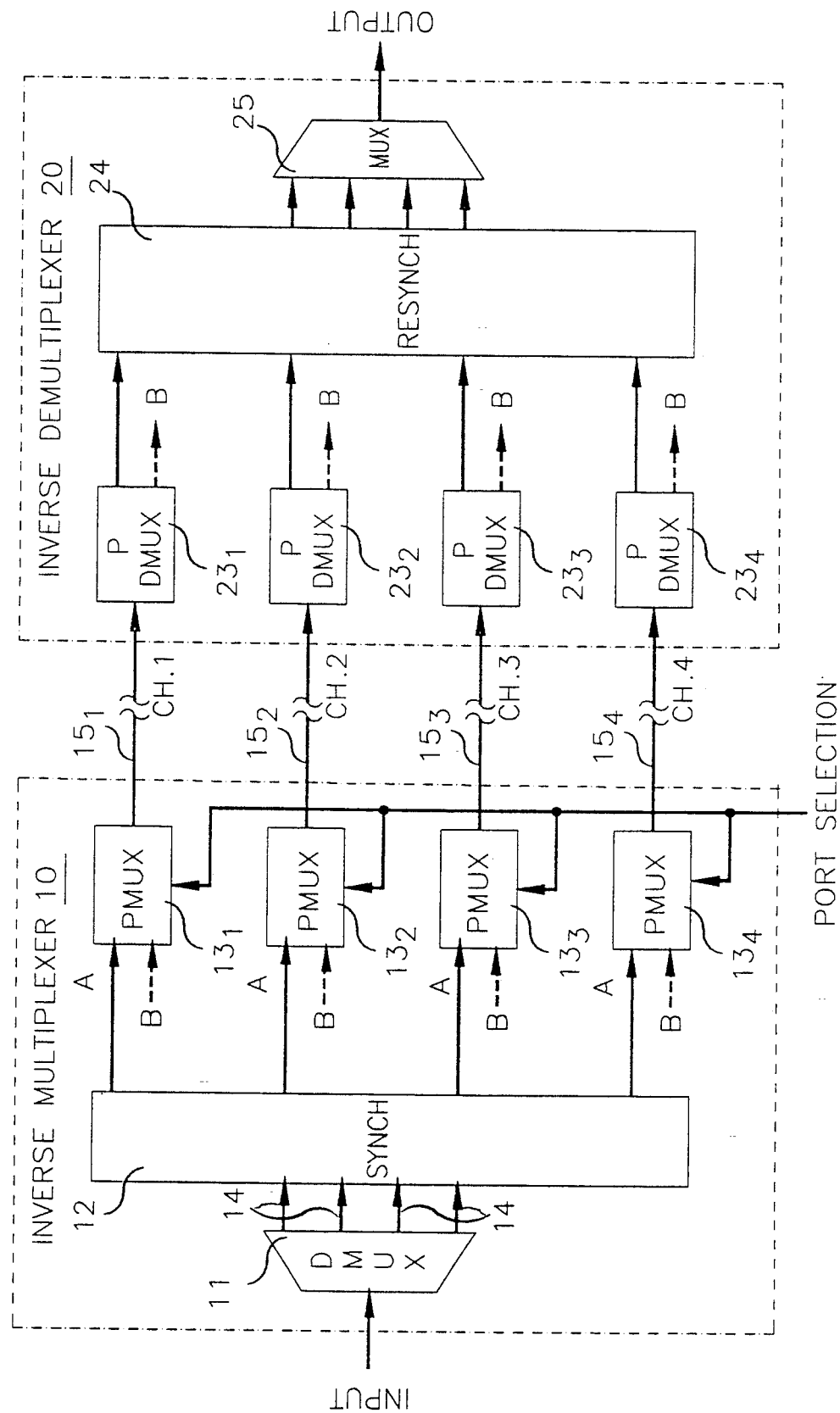
FIG. 1 is a block diagram of an exemplary arrangement of a communication system for practicing the present invention.

FIG. 1 illustrates an exemplary arrangement for each of an Inverse Multiplexer 10 and a remote Inverse Demultiplexer 20 which are interconnected to form an exemplary communication system in accordance with the present invention. For purposes of explanation only, and not for purposes of limitation, the following description of the present invention will be directed to (1) an exemplary Inverse Multiplexer 10 which receives an exemplary SONET ST3 155.52 Mb/s transmission rate input signal, and transmits such input signal over four exemplary DS3 45 Mb/s rate channels $15_1$ to $15_4$ of a conventional communication system to (2) an exemplary remote Inverse Demultiplexer 20 for receiving the exemplary four DS3 channel signals and reconstructing the exemplary original SONET ST3 signal therefrom. It is to be understood that the input signal can comprise any data rate other than the SONET ST3 signal which is greater than the data rate of the communication channels 15 used by the communication system for transmission between remove locations.

In FIG. 1 the exemplary Inverse Multiplexer 10 is shown as comprising a Demultiplexer 11, a synchronization means 12, and a plurality of N=4 Rate Adaptation means which can comprise any suitable means, but hereinafter will be described in relationship to Programmable Multiplexers (PMUXs) $13_1$ to $13_4$. In operation, Demultiplexer 11 receives the exemplary SONET ST3 155.52 Mb/s data rate input signal, and demultiplexes the input signal into a plurality of subsectional output signals, where each subsectional output signal includes a data rate which is less than the exemplary standard 45 Mb/s DS3 channel 15 transmission data rate. Such demultiplexing should produce subsectional output signals with data rates that (1) are fractional parts of the input data rate, and (2) are less than the date rate of the communication system channels 15. It is to be understood that each subsectional output signal should have a data rate less than the communication system channel 15 data rate, but need not have a data rate which equals the date rate of any of the other subsectional output signals. For purposes of explanation only, however, it will be assumed that demultiplexer 11 produces four subsectional output signals having equal data rates of 38.88 Mb/s each, which is less than the 45 Mb/s exemplary DS3 channel 15 transmission data rate.

It is to be understood that demultiplexer 11 could have produced any number of subsectional output signals above 4 with equal or unequal data rates, as long as each of the subsectional output signals had a data rate which is less than the channel 15 transmission data rate of the communication system being used. For the above example, at least 4 subsectional output signals are required for the present exemplary 155.52 Mb/s rate input signal, since any lesser number would produce at least one subsectional output signal with a data rate higher than the exemplary 45 Mb/s channel 15 data rate. Each of these demultiplexer 11 subsectional output signals are transmitted over separate paths 14, or other means, e.g., channels, to a synchronizing means 12.

Figure 6:
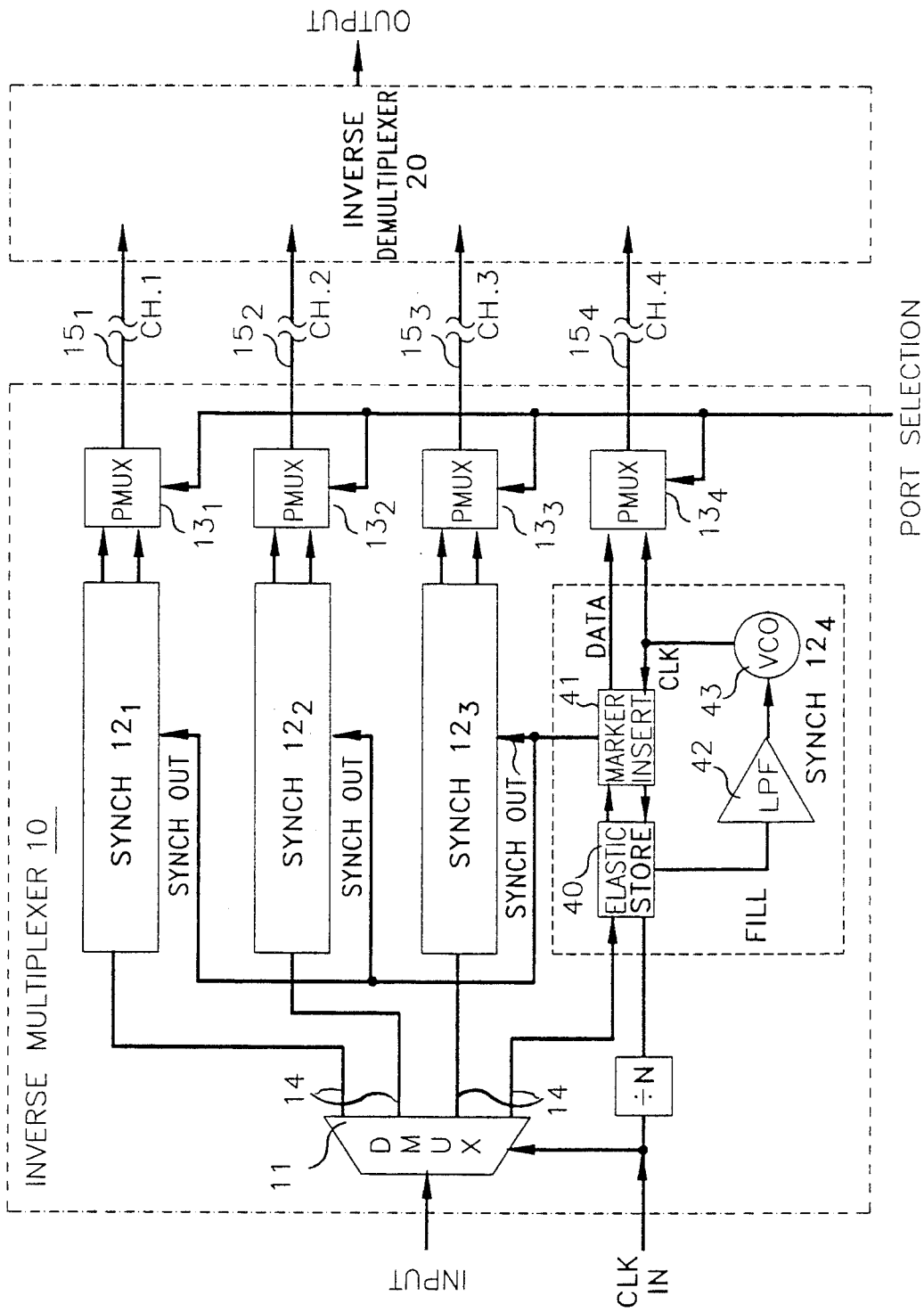
FIGS. 6 and 7 are block diagrams of a preferred embodiment of the synchronization and resynchronization means of FIG. 1.

Synchronizing means 12 can comprise a separate synchronizer for each subsectional output signal from demultiplexer 11, as shown in FIG. 6 for a preferred embodiment of synchronizing means 12. In FIG. 6, an exemplary arrangement for a synchronizer $12_4$, in the transmitting end, is shown as comprising an elastic store 40, a marker insert circuit 41 and a phase lock loop comprising a low pass filter 42 and a Voltage Control Oscillator (VCO) 43. In operation, a clock at the input data rate (e.g., 155.52 Mb/s) is received in Inverse multiplexer 10 and divided by N(e.g., N=4) to produce the subsectional clock signal at the date rate of the input subsectional output signal (e.g., 38.88 Mb/s) from demultiplexer 11. The subsectional clock signal is provided to each of the synchronizers $12_1$ to $12_4$, but, for purposes of simplicity, only one of the synchronizers is shown as receiving this clock signal, which for the present example of FIG. 6 is synchronizer $12_4$. In the synchronizer $12_i$ elastic store 40 receives the subsectional output data and clock signals and places gaps in the data stream to permit markers to be inserted at predetermined intervals. Marker insert 41 receives both the data from the elastic store 40 and the clock signal from the output of the phase lock loop comprising low pass filter 42 and VCO 43, and periodically inserts a market signal into the subsectional output data stream from elastic store 40. Marker insert 41 also provides a clock signal, associated with the clock from the phase lock loop, to elastic store 40, and a synchronizing pulse externally to each of the other synchronizers $12_1$ to $12_3$, if synchronizer $12_4$ is the master synchronizer. Each of the other synchronizers $12_1$ to $12_3$ use such synchronization pulse from marker insert 41 of synchronizer $12_4$ along with the input clock signal provided by phase lock loop 42, 43 as shown as part of synchronizer $12_4$. The data and clock signals from marker insert 41 are then sent to the associated PMUX $13_i$. Therefore, each synchronizer inserts a synchronization marker into each subsectional output signal from DMUX 11 in response to a synchronization pulse, and passes the synchronized subsectional output signal to the associated PMUX $13_i$. For purposes of explanation hereinafrer, it will be assumed that the 38.88 Mb/s subsectional output signal from DMUX 11 was increased to 39.00 Mb/s at the output of each synchronizer 12 by the inclusion of the associated market signal in each synchronizer $12_i$.

Each of the four synchronized data rate subsectional output signals from synchronizing means 12 is provided to the input of a separate one of PMUXs $13_1$ to $13_4$. Since each of the PMUX of the exemplary arrangement of FIG. 1 are shown as receiving a single input signal at a data rate of 39 Mb/s Data Port A and no signal at Data Port B, the following description of PMUX $13_1$ also applies to each of PMUXs $13_2$ to $13_4$. It should be understood, however, that any Inverse Multiplexer should include two functions; tributary synchronization and rate adaptation. Tributary synchronization is required to automatically compensate for difference in the DS3 path lengths of channels 15 due to differences in circuit packs, cross-connect cables, and wires or optical fibers. The problem can be solved by inserting synchronized digital markers into each of the paths or channels 15 at the transmiit end and then using that marker information to realign the frames at the receiving end. The delay required by the realignment process can be provided by large elastic stores.

The second function of rate adaption will always be required since the input data rate will almost never be a convenient multiple of the exemplary DS3 channel rate. A solution is to insert date from another source into fixed positions within the exemplary DS3 frame to stuff the incoming data up to the exemplary DS3 rate. Such synchronization process is described in copending patent application Ser. No. 459,929 filed for R. R. McKnight et al. on the same day as the present application, and assigned to the same assignee. The arrangement of FIG. 1 only shows a single active input at Data Port A to each of PMUXs 13, but the insertion of data from another source at Data Port B, etc., is shown in abovementioned copending patent application to R. R. McKnight et al. Such arrangement will be described briefly once the operation of PMUX $13_1$ with a single input as been described.

PMUX $13_1$ receives the exemplary synchronized 39 Mb/s subsectional input signal and inserts such signal up into the 45 Mb/s DS3 frame so that the signal is substantially evenly distributed over the DS3 frame by mapping the input requirements in the capacity domain into a time domain. As described in detail in the abovementioned copending patent application to R. R. McKnight et al., a PMUX can accomplish this via a 2-step or 3-step digit reversal technique. For purposes of explanation only, the following description is directed to the 2-step digit reversal technique. The fundamental goal of the digit reversal technique is to provide a mapping from a capacity domain to a time domain.

Figure 2:
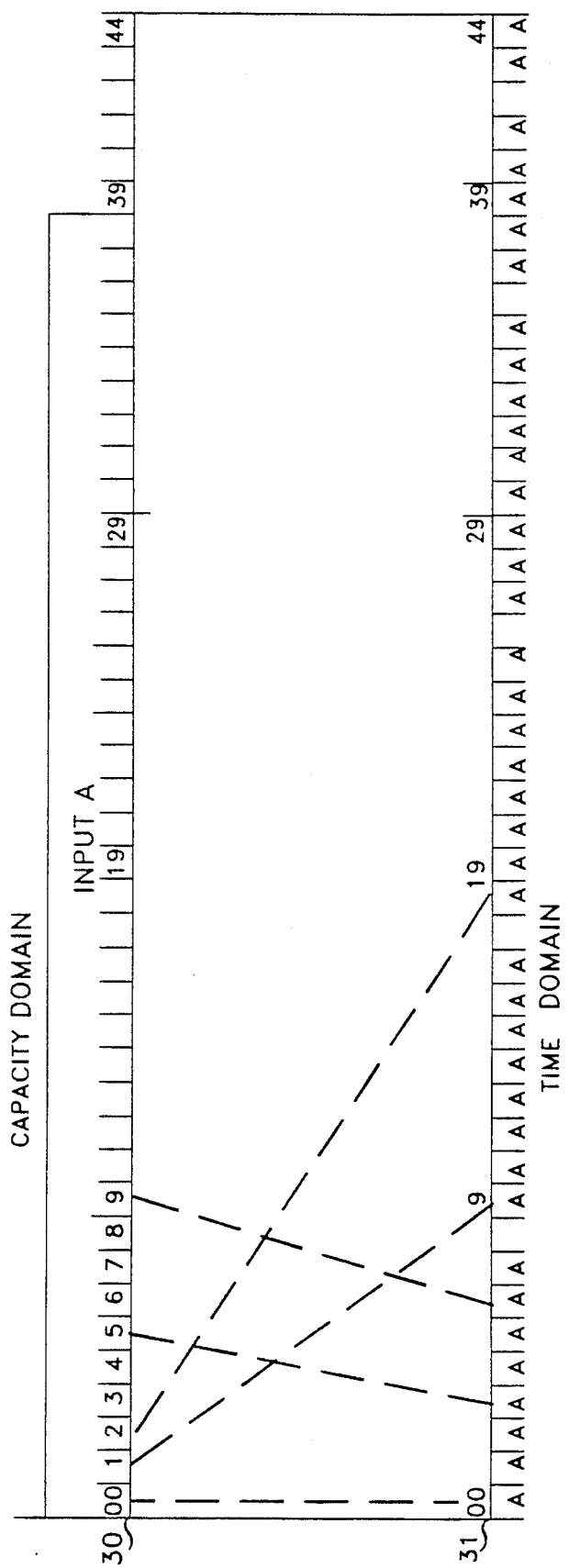
FIG. 2 is an illustration of the preferred rate-adaptation technique which maps a capacity domain frame into a time domain frame for an exemplary input signal to a Programmable Multiplexer in the arrangement of FIG. 1 using a two-step method in accordance with the present invention.

FIG. 2 illustrates an example of the mapping of the capacity domain to the time domain for the 2-step digit reversal technique for a PMUX $13_1$ comprising only the 39 Mb/s subsectional output signal at input data port A. For purposes of description, it will be assumed that the capacity domain includes a capacity frame 30 of forty-five sequential capacity domain time slots (CTSs 00-44) with each Capacity domain Time Slot representing an exemplary 1 Mb/s of capacity. For the present example, data port A receives a subsectional output signal with a 39 Mb/s data rate from synchronization means 12. Since only an integral number of Capacity Time Slots (CTS) can be assigned to a data port, date port A will be assigned 39 CTSs in a contiguous segment of the capacity domain frame. An optional asynchronous pulse stuffing algorithm 72 of FIG. 4 can be used to fill in any fraction of a CTS which is not needed for the subsectional output signal. As shown in FIG. 2 for the capacity domain frame 30, data port A is arbitrarily assigned CTSs 00-38 to accommodate the 39.00 Mb/s capacity requirement. It is to be understood that data ports A could have been assigned any portion of the 00-44 CTSs of the capacity domain frame 30 which does not overlap other data port (e.g., Data Port B) requirements.

In accordance with a first step of the present digit reversal technique, the capacity domain CTS address is decomposed as a predetermined number of digits (e.g., 3 digits for the 00-44 CTS) from a set of number bases. More particularly, to determine the number bases to be used, any combination of numbers that, when multiplied together, will provide the number of CTSs of the capacity domain frame 30 can be used. For example, for the 45 CTSs of the capacity domain frame 30, combinations such a 9 and 5; 3 and 15; and 3, 3, and 5 when multiplied together will yield a value of 45. Although any of these combinations may be used for the following calculations, the following example will use the number bases 3, 3 and 5 since it provides a clearer example of the method. Typically, using a combination with more numbers, e.g. 3, 3 and 5 rather than just 5 and 9, will provide a somewhat more even distribution of the CTSs amongst the Time Domain Time Slots (TDTS) in Time Capacity frame 31. However, factors of 3 are best combined with other factors rather than separate, to obtain uniformity of distribution. Therefore, for the number systems of 3, 3, and 5 to be used, the available range of numbers would be 0-2, 0-2 and 0-4, respectively, as is well known in the art. In decomposing the capacity domain CTS numbers for the exemplary number systems chosen, the first step of the present digit reverse technique uses the equation:

$$X = X_1 \cdot 3 \cdot 5 + X_2 \cdot 5 + X_3 \quad (1)$$

where X is the CTS address, and $X_1$ to $X_3$ are integers which would be substituted to produce the CTS address X.

FIG. 3 shows a Table which illustrates the various values of $X_1$ to $X_3$ which need to be multiplied with the associated data base numbers in Equation (1) to produce each of the CTS addresses. For example, for the CTS address where X=00 in capacity domain frame 30 of FIG. 2, representative of the first CTS of data port A, $X_1$ to $X_3$ would have to equal zero in equation (1) to yield X=00. Similarly, for CTS address X=38 in frame 30 of FIG. 2, representative of the last CTS for data port A, $X_1$ would have to equal 2, $X_2$ would have to equal 1, and $X_3$ would have to equal 3 in equation (1) to yield 30+5+3=38.

Having completed the above first step for each of the used CTSs in capacity domain frame 30, the second step is to generate a digit reverse technique by reversing (1) the number base sequence, and (2) the $X_i$ values, and generate the following equation in the same manner as used for generating equation (1):

$$Y = X_3 \cdot 3 \cdot 3 + X_2 \cdot 3 + X_1 \quad (2)$$

where Y is the assigned representative time slot in a exemplary DS3 Time Domain frame 31, comprising 45 time slots, for the CTS of Capacity Domain frame 30 of FIG. 2. For example, for CTS 05 of Capacity Domain 30 assigned to data port A, in accordance with the Table of FIG. 2, $X_1$ and $X_3$ of equation (1) would equal 0 while $X_2$ would equal 1 to produce X=05. Substituting these $X_i$ values into equation (2) would produce Y=03 representative of time slot 03 of time domain frame 31. Therefore, the data in CTS 05 in frame 30 would be transmitted over channel $15_1$ of FIG. 1 as data in time slot 03 of Time Domain frame 31 using this 2-step digit reverse technique. Similarly, as seen from the Table of FIG. 2, the data assigned to CTSs 08 and 23 would be transmitted over channel $15_1$ in time slots 30 and 31, respectively, of time domain frame 31. In this manner the contiguously assigned capacity domain time slots in frame 30 for data port A are distributed somewhat uniformly through time domain frame 31, as are the unused CTSs for CTSs 39-44, which are stuffed.

An alternative 3-step digit reverse technique can be used to provide a more even distribution of the CTSs of capacity domain frame 30. In this 3-step digit reverse technique the first step of the above-described 2-step technique using equation (1) is repeated as the first step of the 3-step digit reverse technique. A second step of the 3-step digit reverse technique involves the conversion of the determined values of $X_1$ to $X_3$ into equivalent $Y_1$ to $Y_3$ values, respectively, using modular arithmetic as described in the copending patent application to R. R. McKnight et al. The third step of the 3-step digit reverse technique uses the equation $$Y = Y_3 \cdot 3 \cdot 3 + Y_2 \cdot 3 + Y_1 \quad (3)$$

which is derived in the same manner as equation (2) but substitutes the $Y_i$ for the $X_i$ values of equation (2). It is to be understood that the advantage of the present 2-step and 3-step techniques are that the times slots are substantially uniformly distributed within a time domain frame and that all capacity domain CTSs are guranteed to be mapped inside time domain frame 31.

Figure 4:
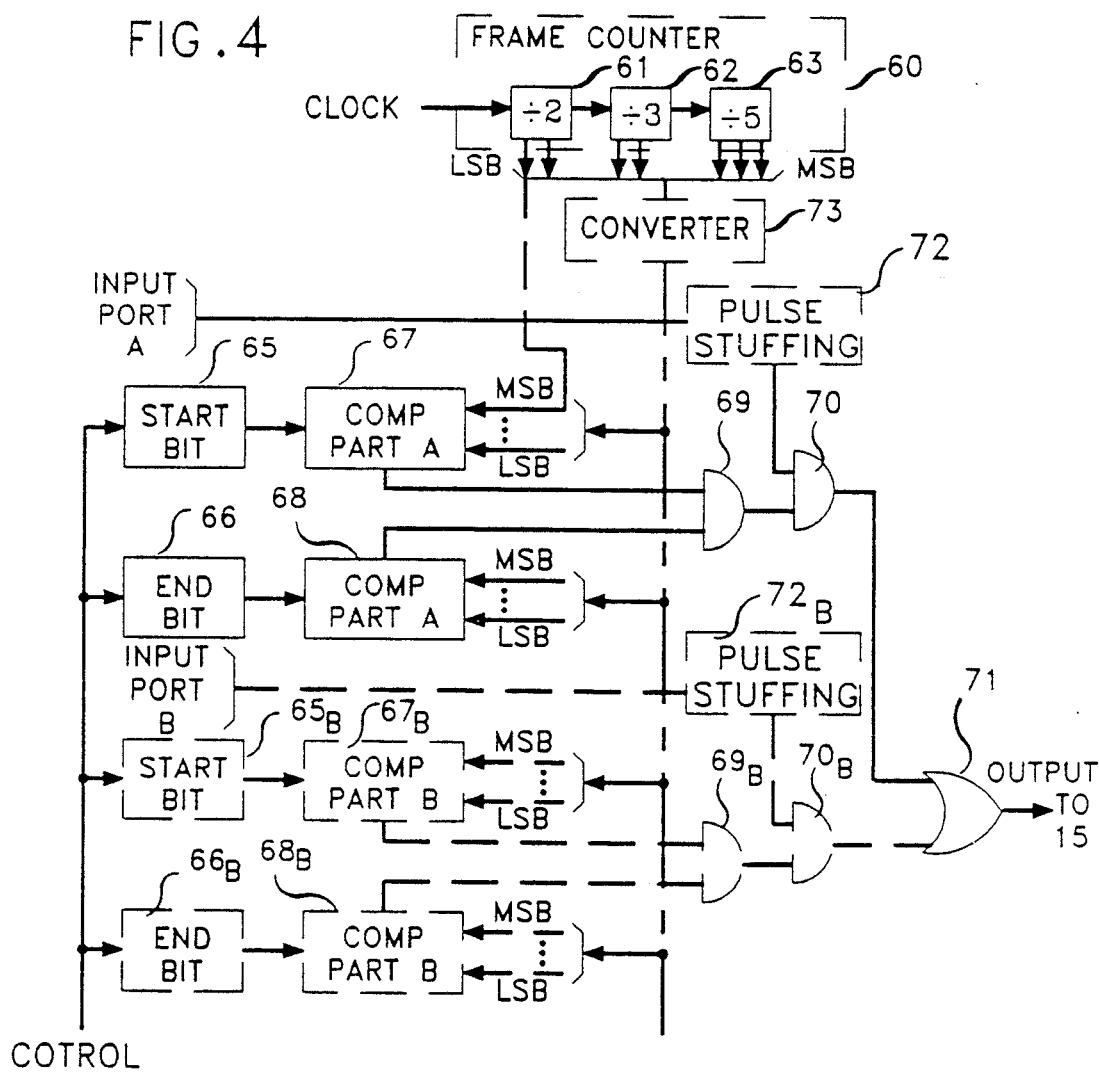
FIG. 4 is a block diagram of an exemplary programmable multiplexer in accordance with the present invention.
Figure 5:
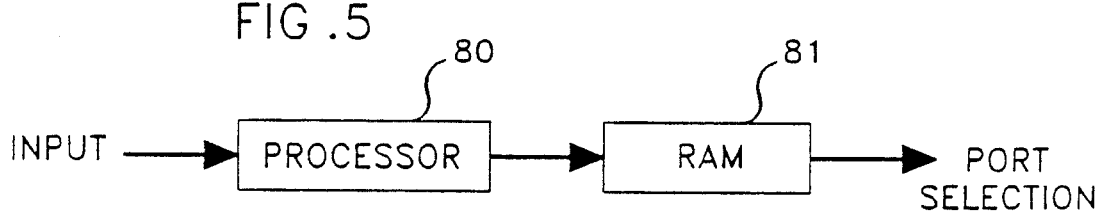
FIG. 5 is a block diagram of an alternative programmable multiplexer in accordance with the present invention.

Exemplary arrangements for programmable multiplexer $13_1$ for performing the above 2-step or 3-step techniques are shown in FIGS. 4 and 5. In FIG. 4 a frame counter 60 receives a clock signal which is passed through a plurality of dividing circuits 61-63 that provide binary value outputs relating to the time slot numbers in time domain frames 31 in FIG. 2. For purposes of explanation, the following description of the PMUX of FIG. 4 will be related to the prior example of a capacity and time domain frame of 45 CTSs, where the number bases 3, 3 and 5 are used. Therefore, frame counter 60 would include a divide-by-3 circuit 61, a divide-by-3 circuit 62, and a divide-by-5 circuit 63. Since the binary output from the divide-by-3 circuits 61 and 62 can only be a binary "0", "1", or "2", there will be two output leads from each divide-by-3 circuit, while the divide-by-5 circuit 63 provides 3 output leads to take care of the possible 000,001,010, 011 and 100 binary codes. The first output lead from divide-by-3 circuit 61 will be considered as the Least Significant Bit (LSB) while the highest value binary output lead from divide-by-5 circuit 63 is considered the Most Significant Bit (MSB). It should be noted that the LSB-MSB bits from frame counter 60 are coupled to comparators 67 and 68 associated with Data Port A, in a reverse order, as shown by the exemplary dashed line for the LSB from divide-by-3 circuit 61 to the MSB input for comparator 67 of Data Port A, to automatically produce the digit reversal technique.

Each input data port terminated as an input to a PMUX 13, is provided with a Start Bit Memory 65 and an End Bit Memory 66 which are coupled to a first associated Comparator 67 and a second associated Comparator 68, respectively. These memories and Comparators are effectively associated with the Capacity Domain frame 30 of FIG. 2. Each of first and second Comparators receives the bits on the 7 output leads from frame counter 60 in the reverse order at separate inputs thereof. The outputs from each of the first and second Comparators 67 and 68, associated with input Data port A, are connected to separate inputs of a separate associated AND gate 69, and the output from AND gate 69 is connected to a first input of a separate second AND gate 70. The data signal from a synchronizer $12_i$ associated with the input Data Port is applied to the second input of the associated AND gate 70. The outputs from the second AND gate 70 is shown as coupled to an input of an optional OR gate 71, with the output of OR gate 71 being applied to channel $15_1$ for transmission to the far-end Inverse Demultiplexer 20.

In operation, a control signal initializes the Start Bit memory 65 and End Bit memory 66 for each of the input data ports, which for the present example is only Data Port A. In the present example shown in FIG. 2, the start and end bit memories 65 and 66 for Data Port A would be set at 00 and 38, respectively, since those are the arbitrarily assigned contiguous CTSs in capacity domain frame 30 of Data Port A. Similarly, the Start and End Bit memories $65_B$ and $66_B$ for any other Data Port that could be connected to the input of PMUX $13_1$ would be set at 39 and 40–44, respectively, depending on the amount of capacity domain required, but could not be more than the unassigned 6 CTSs.

In the present example, when frame counter 60 provides binary signals on its 7 output leads indicating the address of a particular Time Domain Time slot, each of first comparators 67 compares the associated stored Start Bit value with the bit reverse binary value from frame counter 60 and outputs a binary "1" if the reversed binary value from frame counter 60 is equal to or greater than the associated Start Bit value, and a "0" if the reversed binary value from frame counter 60 is less than the stored Start Bit. Similarly, each of second comparators 68 compares the associated stored End Bit value with the reversed binary values from frame counter 60 and outputs a binary "1" if the associated End Bit value is equal to or less than the received reversed binary value from frame counter 60, and a binary "0" if the associated End Bit value is greater than the reversed binary value received from frame counter 60.

Therefore, for the period of time of time domain time slot number Y=12, frame counter 60 would output the equivalent binary value for 1,1,0 for $X_3$ to $X_1$, respectively, as shown in the Table of FIG. 3. Each of comparators 67 and 68 for Data Ports A (and B) would receive the reverse value of 0,1,1 (X=06) from the counter 60, because of the lead reversal between frame counter 60. Comparators 67 then compare the stored Start Bit value of associated memory 65 with the received reverse binary code. Only comparator 67 for Data Port A would output a binary "1" since this comparator would find it equal to or greater than the stored Start Bit value of 00 in associated Start Bit memory 65. Comparators 67 for any other Data Port would determine that the received reverse binary code is less than the stored Start Bit value and output a binary "0". However, for comparators 68 of Data Port A, and Data Port B, each comparator 68 would output a binary "b" since the received binary code 0,1,1 (equal to digit X=6) is less than the End Bit value stored in each of End Bit memories 66.

As a result, only AND gate 69 associated with Data Port A would produce a binary "1" enable output signal during time domain frame time slot Y=12 because both of its inputs from comparators 67 and 68 equal a binary "1". This enable output signal from AND gate 69 of Data Port A provides a binary "1" enable signal to AND gate 70 to permit the input data signal from Data Port A to pass therethrough, and to optical OR gate 71, for transmission over channel $15_1$. A similar process occurs for each of the time domain time slots Y=00–38 in the Table of FIG. 3 to permit Data Port A to be accessed in accordance with the capacity domain during each of the Time Domain Time Slots. If Data Port B were included, then the associated comparators $67_B$ and $68_B$ and AND gates $69_B$ and $70_B$ would operate to permit Data Port B to be accessed in accordance with the capacity domain CTSs 39 and up during each of the time domain time slots.

To permit the 3-step technique to be performed, an optional converted 73 need only be disposed at the output of frame counter 60 to perform the conversion for the number base values from $X_1$ to $X_3$ to $Y_1$ to $Y_3$, respectively, using modular arithmetic as described in copending patent Application to R. R. McKnight et al. These converted $Y_1$ to $Y_3$ values are then used in equation (2) for $X_1$ to $X_3$, respectively. FIG. 5 illustrates an exemplary alternative preferred arrangement for performing the 2-step or 3-step digit reverse technique, in which the capacity domain parameters are provided to a processor 80, such as a personal or other computer or microprocessor, and processor 80 performs the appropriate 2-step or 3-step capacity domain to time domain calculations. The results are then stored in a RAM 81 and used in a table look-up manner to provide port selection to multiplex the input Data Port A (and B) signals onto channels $15_1$ to $15_4$ in the manner shown in FIGS. 2 and 3.

At the receiving end, Inverse Demultiplexer 20 of FIG. 1 includes a plurality of Programmable Demultiplexers (PDMUXs), which for the exemplary four channel system are designated $23_1$ to $23_4$. The output from PDMUXs $23_1$ to $23_4$ are the recovered exemplary 39.00 Mb/s data rate signals that were provided as inputs to PMUXs $13_1$ to $13_4$, respectively at Inverse Multiplexer 10. The output signals from PDMUXs $23_1$ to $23_4$ are provided as inputs to a resynchonizing means 24. The PDMUXs $23_1$ to $23_4$, and resynchronizing means 24, at the receiving end operate in the reverse manner from the PMUXs $13_1$ to $13_4$ and synchronizing means 12 at the transmitting end, to recover the original exemplary demultiplexed 38.88 Mb/s input data signals. A Multiplexer 25 then multiplexes the four exemplary 38.88 Mb/s output signals from desynchronizing means 24 to produce the original exemplary SONET ST3 155.52 Mb/s input signal and transmit it to an end user device.

Figure 7:
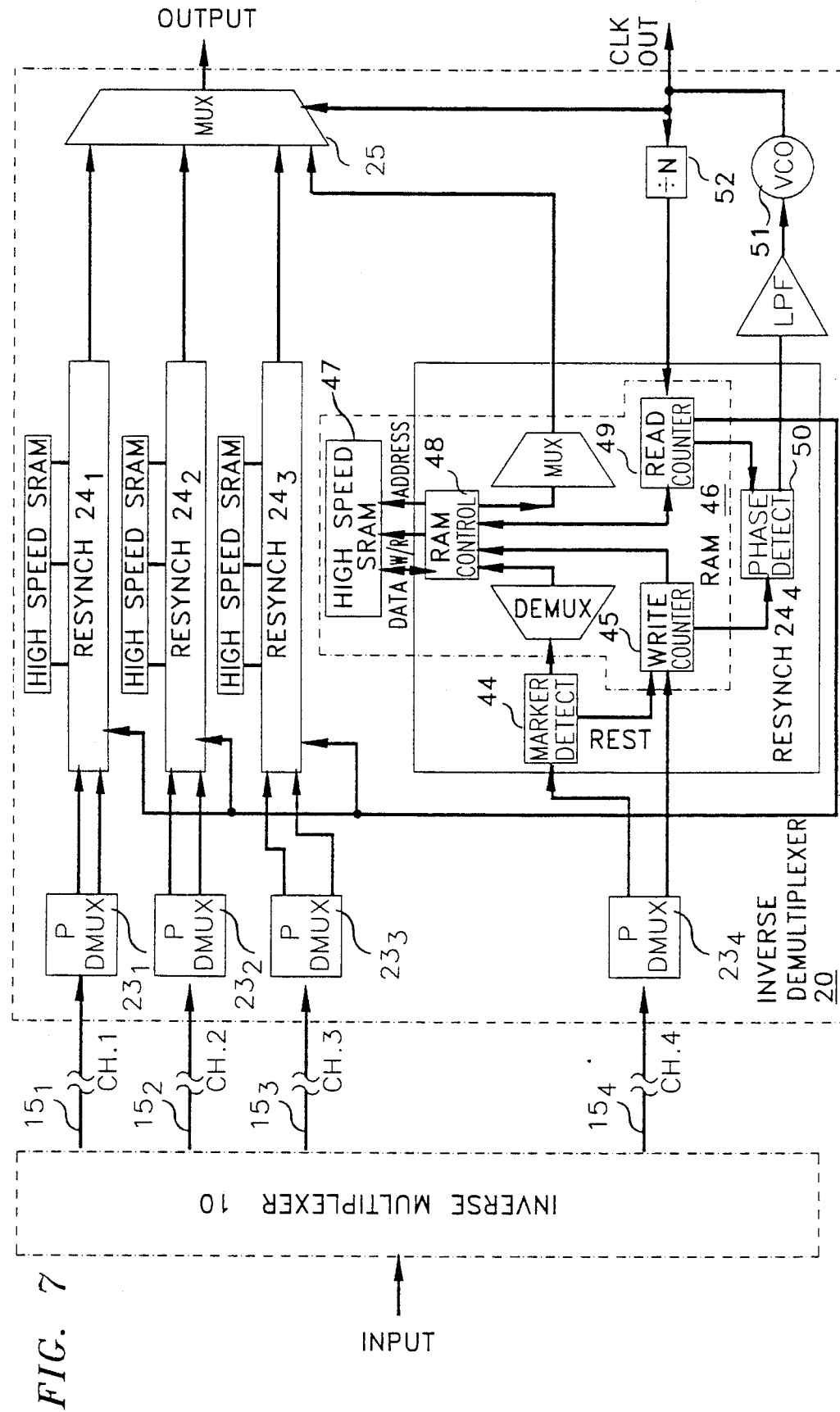

At the receiving end, in Inverse Demultiplexer 20, the resynchronizer means 24 can comprise separate resynchronizers $24_1$ to $24_4$, for each of PMUXs $23_1$ to $23_4$, respectively. As shown in FIG. 7, the data and clock subsectional signals from each of PMUX $23_1$ to $23_4$ is received in resynchronizers $24_1$ to $24_4$, respectively. The Random Access Memory (RAM) 46 is used as a large elastic store to compensate for differences in propagation delay in transmission channels $15_1$ to $15_4$. For purposes of explanation, the following discussion is directed to the operation of resynchronizer $24_4$, and it should be understood that each of resynchronizers $24_1$ to $24_3$ operate in a similar manner. The data subsectional signal from PMUX $23_4$ is received in a marker detect 44 which detects the marker inserted by marker insert 41 of synchronizer $12_4$ in the distant Inverse Multiplexer 10, and sends both the marker detect output signal as a reset signal to a write counter 45 forming part of a RAM 46, and the received data stream to a High Speed RAM 47 via its control circuit 48. The clock subsectional signal is also received in write counter 45, and is used to increment the address signal to the RAM for writing the data stream from marker detect 44 into sequential addressed memory locations within RAM 47. A read counter 49 functions to addresses RAM 47 to read out the stored data at a subsectional output rate equal to the exemplary 38.88 Mb/s data rate, excluding the markers inserted by marker insert 41 of Inverse Multiplexer 10, and deliver such data stream to MUX 25. In Mux 25, the data from resynchronizers $24_1$ to $24_4$ are multiplexed to generate the SONET 155.52 Mb/s output signal. Read counter obtains the clock signals for reading the data from RAM 47 from a phase locked loop comprising a Phase Detector 50, which compares the read and write counter phases to generate a control signal for Voltage Control Oscillator 51, which is corrected to produce an output signal which equals the 155.52 Mb/s rate. The Divide-By-N circuit 52 generates the 38.88 Mb/s clock signal for read counter 49. Read counter 49 in resynchronizer $24_4$ also generates a synchronization pulse at the same time it resets itself, with the repetition period equal to the marker insertion interval used by marker insert 41 generated in synchronizer $12_4$ of Multiplexer 10. This synchronization pulse from read counter 49 in resynchronizer $24_4$ is distributed to resynchronizers $24_1$ to $24_3$ to reset their associated read counters 49. Because each write counter 45 in resynchronizer $24_1$ to $24_4$ is reset by the synchronization marker associated with its respective subsectional data signal, the data written into RAMs 47 of each of resynchronizers $24_1$ to $24_4$ is resynchronized with respect to the RAM addresses obtained from write counters 45 in the associated resynchronizer. Because the read counters 49 in each of resynchronizers $24_1$ to $24_3$ are synchronized to read counter 49 in resynchronizer $24_4$, the data is read out of the RAMs 47 of resynchronizers $24_1$ to $24_4$ and presented to the multiplexer 25 in resynchronized order.

It is to be understood that other modifications can be made to the arrangements described hereinbefore and still fall within the spirit and scope of the invention. For example, it is possible to perform asynchronous pulse stuffing in each of PMUX $13_1$ to $13_4$ by including additional input ports beyond input A, and optional inputs B, which provide stuffing indicator bits. Then, any additional unused capacity domain time slots (CTSs) can be used to increase the contiguous CTSs for an input Data Port, and the additional PMUX 13 input ports can be used to indicate the stuff bits at the appropriate time domain time slots. Furthermore, the original exemplary 155.52 Mb/s input signal to DMUX 11 could have been demultiplexed into other than four 38.88 Mb/s subsectional output signals, as, for example, eight 19.44 Mb/s subsectional output signals. For such example, it is possible for each of the 19.44 Mb/s signals to be stuffed to, for example, a 20 Mb/s synchronizer 12 output signal, and a separate two of the eight 20 Mb/s subsectional output signals provided to the A and B data ports of PMUXs $13_1$ to $13_4$, since the combination of two 20 Mb/s signals is less than the 45 Mb/s DS3 rate.

We claim:

1. A method of transmitting a first data rate input signal to a remote terminal over transmission channels including a lower second data rate, the method comprising the steps of:

(a) demultiplexing the first data rate input signal into a plurality of subsectional output signals, each subsectional output signal comprising a data rate which is lower than the second data rate;

(b) inserting a marker signal at a predetermined timing relationship into each of the plurality of subsectional output signals at predetermined intervals;

(c) receiving at separate inputs of each of one or more rate adaptor means, subsectional output signals from step (b) that in combination for each rate adaptor means does not total more than the capacity of the second data rate, and inserting those subsectional output signals into a separate output signal at the second data rate; and (d) transmitting two or more second data rate signals from step (c) two or more second data rate transmission channels to a remote one or more receivers for recovery of the first data input signal;

wherein in performing step (c) performing the substeps of:

(c1) assigning each subsectional output signal associated with a rate adaptor means to or one or more predetermined contiguous addresses of a capacity domain frame dependent on the data of the received subsectional output signal, where the capacity domain frame includes a predetermined number of assignable addresses;

(c2) in each rate adaptor means, converting each of the contiguous addresses of the capacity domain frame for each of the received subsectional output signals from step (b) to non-contiguous addresses in a time domain frame so that the non-contiguous addresses are substantially uniformly distributed over the time domain frame; and in performing step (d) transmitting sections of one of the subsectional output signals during each address of the time domain frame sequence, as determined in step (c), via one of the second data rate transmission channels to a remote one or more receivers for recovery of the first data rate input signal.

2. The method according to claim 1, wherein in performing step (c2), performing the substeps of (e) in each rate adaptor means, counting through a time domain frame in a predetermined sequence from a first to a last address of a counting sequence, the counting sequence being respresented by a multibit word including N individual segments;

(f) generating N binary words, each word containing one or more bits each word being associated with one of the N segments of step (e);

(g) comparing the multibit word from step (f) in a reverse order with a first and a second number defining a start and stop address, respectively, associated with predetermined contiguous addresses in the capacity domain assigned in step (c1) to each of the subsectional output signals, for assigning which one of the one or more subsectional output signals will be assigned to each address of the time domain frame.

3. The method according to claim 2, wherein in performing step (f), performing the substeps of (f1) converting the predetermining number of addresses in the capacity domain frame into a plurality of separate number bases which when multiplied together yield said predetermined number of addresses in the capacity domain frame; and (f2) translating each of the addresses of the capacity domain frame into a separate binary word for each of the number bases determined in step (f1).

4. The method according to claim 3 wherein in performing step (g), using the number bases in reverse order from that of step (f1) and the binary output values from step (f2) in a reverse order for assigning each time domain frame address to a particular one of the one or more subsectional output signals.

5. The method according to claim 1 wherein the method comprises the further step of:

(e) concurrently performing steps (b) to (d) at each of the two or more rate adaptor means, and each rate adaptor means performing step (d) by transmitting sections of the associated subsectional output signals over a separate one of the second data rate channels.

6. The method according to claim 5 wherein the method comprise the further steps of:

at the remote receiver, (f) receiving a time domain frame sequence, transmitted in step (d) by each of the one or more first rate adaptor means, at a separate second rate adaptor means for recovering each subsectional output signal forming said time domain frame sequence at a separate output of each second rate adaptor means; .

(g) removing the marker signal from each of the recovered subsectional output signals forming each time domain frame; and (h) multiplexing each of the subsectional output signals from each of the second rate adaptor means into an output signal corresponding to the first data rate input signal.

7. The method according to claim 1 wherein the method comprises the further steps of:

at the remote receiver, (e) receiving the time domain frame sequence, transmitted in step (d) by each of the one or more first rate adaptor means, at a separate second rate adaptor means for recovering each subsectional output signal forming said time domain frame sequence at a separate output of the second rate adaptor means;

(f) removing the marker signal from each of the recovered subsectional output signals forming each time domain frame; and (g) multiplexing each of the subsectional output signals of step (f) from each of the second rate adaptor means into an output signal corresponding to the first data rate input signal.

* * * * *